No. 836,319. PATENTED NOV. 20, 1906.
G. A. GRAVES & D. W. KELLEY.
ANIMAL TRAP.
APPLICATION FILED MAR. 24, 1906.
2 SHEETS—SHEET 1.
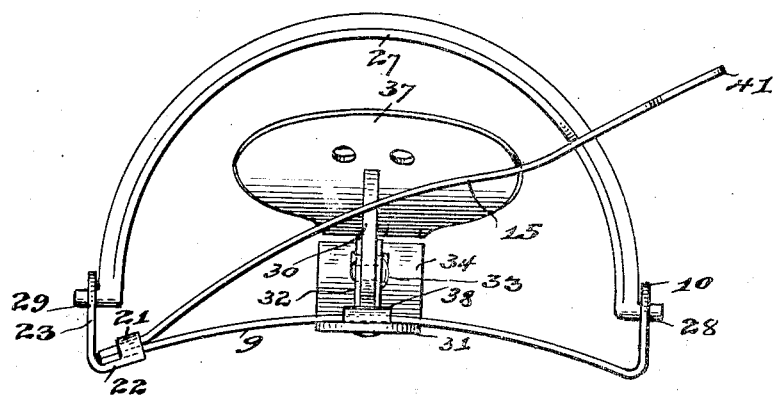
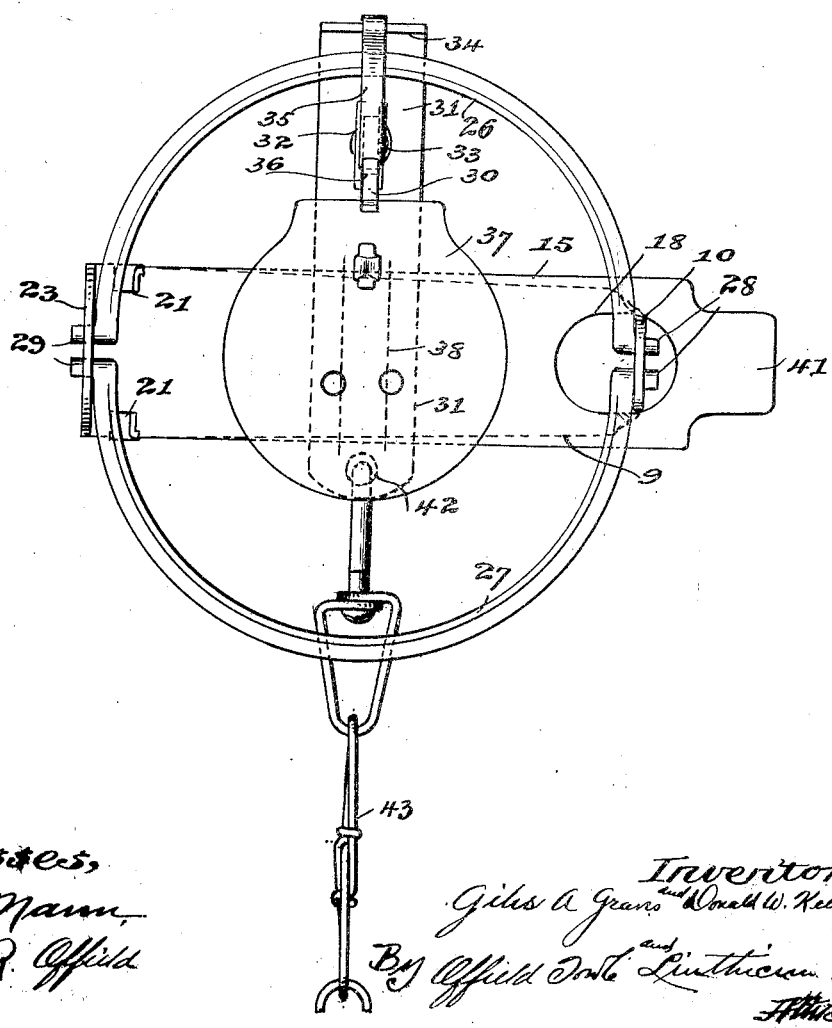

No. 836,319. PATENTED NOV. 20, 1906.
G. A. GRAVES & D. W. KELLEY.
ANIMAL TRAP.
APPLICATION FILED MAR. 24, 1906.
2 SHEETS—SHEET 2.
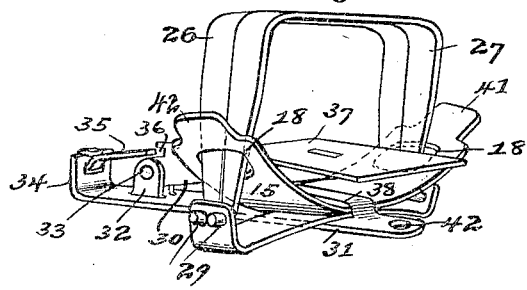
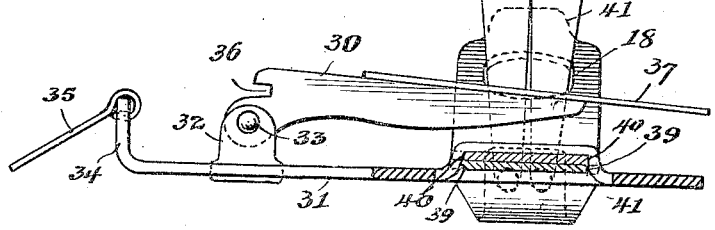
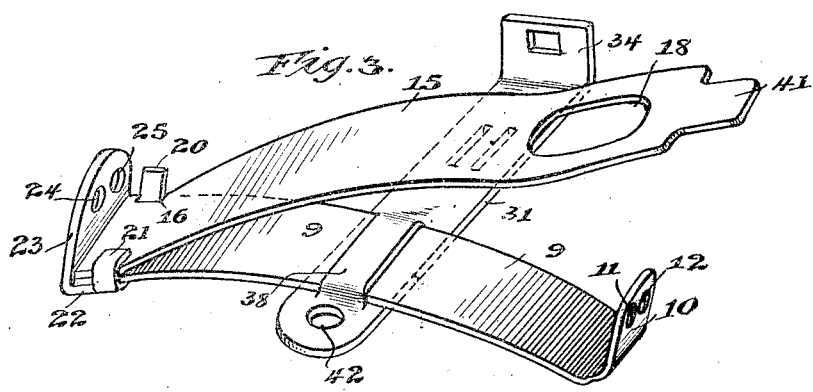
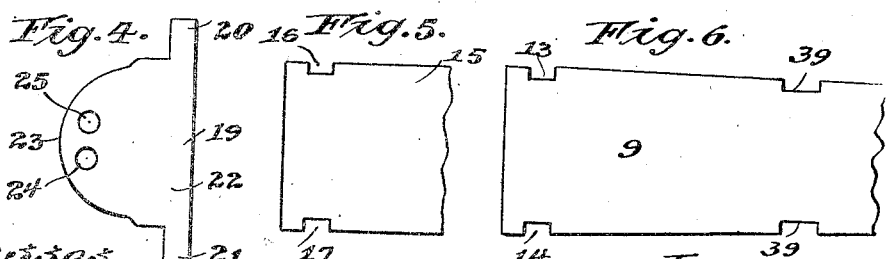

UNITED STATES PATENT OFFICE.

GILES A. GRAVES AND DONALD W. KELLEY, OF ABINGDON, ILLINOIS, ASSIGNORS TO THE ANIMAL TRAP COMPANY, OF ABINGDON, ILLINOIS, A CORPORATION OF ILLINOIS.

ANIMAL-TRAP.

No. 836,319.   Specification of Letters Patent.   Patented Nov. 20, 1906.

Application filed March 24, 1906. Serial No. 307,842.

*To all whom it may concern:*

Be it known that we, GILES A. GRAVES and DONALD W. KELLEY, citizens of the United States, residing at Abingdon, in the county of Knox and State of Illinois, have invented certain new and useful Improvements in Animal-Traps, of which the following is a specification.

This invention pertains to improvements in animal-traps of the class wherein a pair of gripping-jaws are actuated by a spring-tongue which when in set position or under tension is held by a movable dog resting in a slot in the end of a trigger and sprung by depressing the trigger until the dog is released from the slot, thus allowing the spring to close the jaws.

Traps of this class are generally composed of four main parts—namely, the base, jaws, spring-tongue, and cross-arm carrying the trigger and platform—and the method of connecting the spring-tongue and cross-arm to the base is by rivets or by extending the end of the tongue through a slot in the base, both of which methods weaken the structure—the rivets by the apertures and strain given the metal when headed, while slotting the base at the bending-point weakens it where strength is essential. The cross-arm is generally secured centrally of the base by rivets, and as the tension is greatest at that point when the trap is set, it renders the base very weak, and experience has proven that breakage is frequent at both points.

In our construction we overcome these difficulties by securing the spring-tongue to the base-plate by a soft-metal clip bent at substantially a right angle, the upright portion adapted to receive the teats of the jaws and the horizontal or base portion provided with ears capable of being bent over and upon the base and spring-tongue, thereby securing the two members firmly together without the use of rivets. By this construction the sharp angle at one end of the base-plate is avoided, which, being formed of spring metal is subject to being fractured both before and after riveting.

The cross-arm is secured to the base member by upsetting a strip of the metal of the arm by means of a die, leaving both ends still connected. The base member is placed under the strip, which is then forced down around it, thus securing the two members together.

In the double-spring form of traps of this class both the base and the spring are placed under the strip in the cross-arm and all secured in the same manner as above stated.

In the drawings, Figure 1 is an edge elevation of a trap with the spring released. Fig. 2 is a plan view of a trap in set position. Fig. 3 is a perspective elevation of the base, spring, clip, and cross-arm. Fig. 4 is a plan view of the clip in flat or blank form. Figs. 5 and 6 are plan views of the end portions of the spring and base members, respectively. Fig. 7 is a sectional elevation of a trap of the double-spring type, and Fig. 8 is a perspective elevation of a trap where the double spring is employed.

Referring more particularly to the drawings, 9 is a base having one end 10 bent at substantially a right angle to its body and provided with apertures 11 12, its opposite ends having notches 13 and 14.

15 is a spring having the notches 16 and 17 formed to register with the notches 13 and 14 and provided with the elongated aperture 18, adapted to receive a pair of jaws and the edges of which act upon the jaws for closing the same.

The base and spring are rigidly secured together by a soft-metal clip or clamp 19, provided with the ears 20 and 21, so that upon bending the clip at substantially a right angle centrally and transversely of its body portion a base or seat 22 is formed, upon which the notched ends of the base and spring rest. The ears 20 and 21 are then bent upward into the notches, which are in register, and over upon the spring-tongue, when the spring and base are securely held together.

The upright bent portion 23 forms an end similar to the end 10 and is also provided with apertures 24 and 25.

The clamping-jaws 26 and 27 are of the usual style and are provided with the teats 28 and 29, which have a pivotal engagement with the apertures 11, 12, 24, and 25, respectively.

The spring-tongue extends forwardly and is normally tensioned upwardly from its connection with the base, as shown in Fig. 3, and when the trap is set the free end of the spring is depressed to a plane substantially parallel with the base, but lower than the teats 28 and 29, and there held by the trigger 30, which is secured to the cross-arm 31 by the pivot-lugs 32 and the pivot-pin 33. One end 34 of the cross-arm is bent at substantially a right angle to its base and carries the dog 35, adapted to seat itself in the groove 36 in the trigger and to retain the spring in tensioned position until released.

37 is the usual platform secured to the trigger.

Particular attention is called to the method of securing the cross-arm to the base member, which is accomplished by upsetting a strip of metal by a die, forming the strip 38 with its ends connected integrally to the cross-arm. The base is then inserted between the strip and the body of the cross-arm and the strip forced down around the base, thereby securely holding the parts together.

41 is a tip at the end of the spring-tongue to facilitate the setting of the trap, while 42 is an aperture in the end of the cross-arm, which affords means for securing the chain 43 thereto.

In the preferred form we construct the base member in the single-spring type with the notches 39, and in the double-spring type we provide similar notches 40 in the spring, which register with the notches 39, so that when the strip of metal in the cross-arm is forced down around the base or base and spring together it is forced into the notches, and thereby prevents any relative sliding movement between the base and cross-arm or base-spring and cross-arm.

Fig. 7 shows a cross-section of the double-spring type of trap, wherein the base and spring have the notches 39 and 40 registering and the metal strip forced into them. It is, however, obvious that the base and spring may be secured to the cross-arm without the notches, as shown in Fig. 8.

Having fully described our invention, what we wish to claim, and desire to secure by Letters Patent, is—

1. In an animal-trap of the class described, the combination with a base member, of a spring-tongue and a metal clip provided with ears adapted to clamp said base and tongue together, substantially as described.

2. In an animal-trap of the class described, a base member, a spring-tongue and a metal clip provided with ears adapted to clamp said base and tongue together, in combination with jaws pivotally connected to said base and clip, and a trigger and dog for holding the jaws in open position, substantially as described.

3. In an animal-trap of the class described the combination of a base, a cross-arm and a metal strip, said strip upset from one of the members and joined at its ends thereto and adapted to be pressed around the other member to secure said members together, substantially as described.

4. In an animal-trap of the class described, the combination with a cross-arm, of a base overlying said cross-arm transversely thereof, and a raised strip overlying said base, said strip being joined at its ends to said cross-arm and clamping said base thereto, substantially as described.

5. In an animal-trap of the class described, the combination with a base and spring-tongue member having formed in their edges registering notches, of a clip having ears adapted to engage said notches and clamp said members together, substantially as described.

6. In a trap of the class described, the combination with a jaw-base, of a cross-arm, a trigger supported thereon, and an integral loop offset from the body of one of said members and beneath which the other member is passed whereby said base and arm are interconnected at substantially right angles to each other, substantially as described.

GILES A. GRAVES.
DONALD W. KELLEY.

Witnesses:
G. A. SHIPPLETT,
RICHARD E. HARVEY.